(12) United States Patent
Oino (10) Patent No.: US 7,665,790 B2
(45) Date of Patent: Feb. 23, 2010

(54) PARTITION

(75) Inventor: Hideki Oino, Niiza (JP)

(73) Assignee: Honda Access Corporation, Niiza-shi (JP)

( * ) Notice: Subject to any disclaimer, the term of this patent is extended or adjusted under 35 U.S.C. 154(b) by 0 days.

(21) Appl. No.: 12/189,441

(22) Filed: Aug. 11, 2008

(65) Prior Publication Data

US 2009/0066105 A1   Mar. 12, 2009

(30) Foreign Application Priority Data

Sep. 10, 2007   (JP)   ............... 2007-234765

(51) Int. Cl.
*B60R 7/02*   (2006.01)
(52) U.S. Cl. ............... 296/37.16; 296/24.4; 224/539
(58) Field of Classification Search ............... 296/24.4, 296/24.44, 37.16; 224/539, 542, 925
See application file for complete search history.

(56) References Cited

U.S. PATENT DOCUMENTS 7,318,617 B1 *   1/2008   Scotton   ............... 296/37.16

2002/0179663 A1 *   12/2002   Moore et al.   ............... 224/539

FOREIGN PATENT DOCUMENTS

| JP | 61-94450 U | 6/1986 |
| JP | 3230083 B2 | 11/2001 |
| JP | 2007-234765 A | 9/2007 |

* cited by examiner

*Primary Examiner*—Joseph D Pape
(74) *Attorney, Agent, or Firm*—Westerman, Hattori, Daniels & Adrian, LLP (57) ABSTRACT

A partition which can fully prevent a luggage from moving is provided. A partition which divides the luggage room of a vehicle two dimensionally has a main partition member which divides the luggage room in one direction and sub partition members which divide the luggage room in another direction. The main partition member has connection parts detachably connected to respective anchors provided in the luggage room. The sub partition member has a connection part provided at one end thereof, and the other end thereof is coupled to the main partition member. The main partition member has the connection parts at both side ends thereof, and the sub partition members divide the luggage room in a direction orthogonal to the main partition member.

16 Claims, 9 Drawing Sheets

PARTITION

BACKGROUND OF THE INVENTION

1. Field of the Invention

The present invention relates to a partition which divides the luggage room of a vehicle to prevent a luggage from moving.

2. Description of the Related Art

Japanese Patent Application No. 3230083 discloses a vehicular luggage storage bag as a conventional partition which prevents a luggage from moving. The bag comprises a net formed in such a manner as not to be elastically deformed, and a mesh net which is formed in such a manner as to be elastically deformed. The net and the mesh net are superimposed with each other in a two-faced manner, a non-stretch tape is attached to the peripheral edges of the net and the mesh net positioned back-to-front, and the net, the mesh net and the tape are stitched together to form a bag. The bag has an opening which is closable with a coupler, and has hanging rings, each formed of an extensible cord of a coupling tape, at the four corners of the bag.

By employing such a structure, the vehicular luggage storage bag of the foregoing literature has an effect that the bag can pack a luggage and hold it thereinside, and prevent a luggage outside the bag from moving in a luggage room.

However, the bag of the foregoing literature can divide the luggage room in the front-back direction (one direction) of a vehicle, but cannot divide the luggage room in the right-left direction (another direction) of the vehicle. Accordingly, a luggage in the luggage room may move in response to rolling of the vehicle side to side, and it is difficult to fully prevent the luggage from moving.

The present invention has been made in view of the foregoing circumstance, and it is an object of the invention to provide a partition which can fully prevent a luggage from moving.

SUMMARY OF THE INVENTION

To achieve the object, a partition according to the first aspect of the invention divides a luggage room of a vehicle two dimensionally and comprises: a main partition member which divides the luggage room in one direction; and at least one sub partition member which divides the luggage room in another direction, and wherein the main partition member includes a connection part detachably connected to an anchor provided in the luggage room, and the sub partition member has a connection part at one end thereof, and is coupled to the main partition member through the other end of the sub partition member.

According to the second aspect of the invention, the main partition member may have connection parts at both side ends of the main partition member, and the sub partition member may divide the luggage room in a direction orthogonal to the main partition member.

According to the third aspect of the invention, the foregoing partition may further comprise sticking means for detachably holding an outer periphery of the sub partition part to a surface of the main partition member, and wherein the sub partition member may be fixed to the main partition member to form a storage part.

According to the fourth aspect of the invention, the main partition member may have a reflective member at an upper side of the main partition member.

According to the partition of the present invention, the degree of freedom for a user to partition a luggage room can be improved, thereby fully preventing a luggage from moving.

According to the partition of the invention, it is possible to divide a luggage room not only in the front-back direction, but also in the right-left direction, i.e., the partition can divide the rear portion of the luggage room into three portions: a left portion; a right portion; and a center portion.

Further, according to the partition of the invention, a relatively large luggage can be held by a main partition member, and small luggage can be stored and held by forming a storage part.

Still further, according to the partition of the invention, because of the visibility of a separation position with the door of a luggage room being opened, the workability of a user can be improved.

DETAILED DESCRIPTION OF THE PREFERRED EMBODIMENTS

Preferred embodiments of the invention will be explained with reference to the accompanying drawings.

1. First Embodiment (1) General Structure

Figure 1:
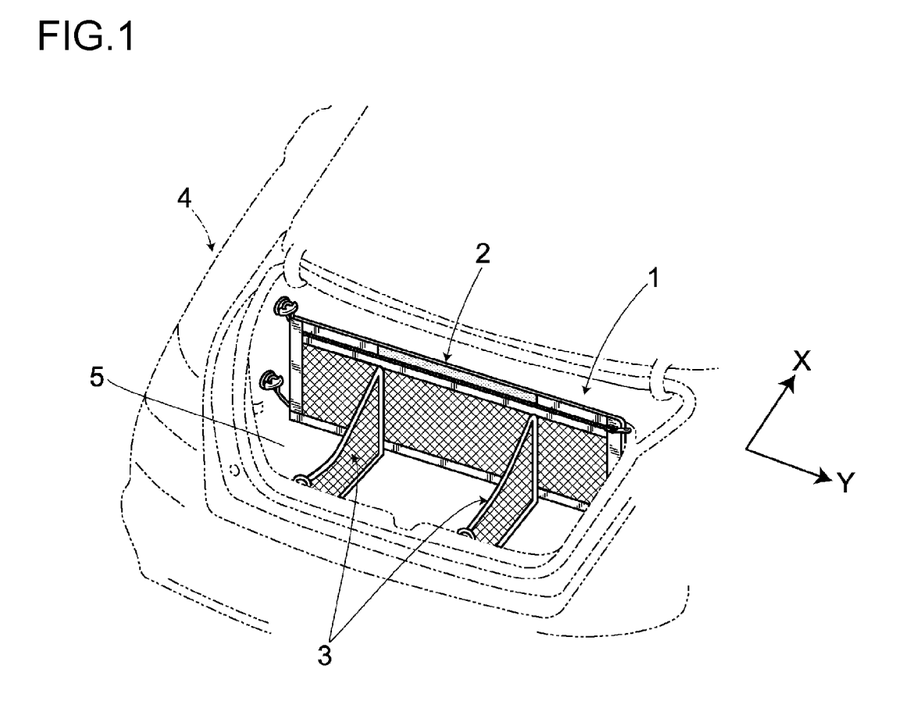
FIG. 1 is a perspective view showing how a partition according to the first embodiment of the invention is used.

As shown in FIG. 1, a partition 1 which has a main partition member 2 and sub partition members 3 is detachably disposed inside a luggage room 5 of a vehicle 4, and divides the luggage room 5 of the vehicle 4 in a two-dimensional manner. That is, the partition 1 has the main partition member 2 which divides the luggage room 5 in the front-back direction of the vehicle 4 as one direction (X direction in the figure), and the sub partition member 3 which divides the luggage room 5 in the right-left direction of the vehicle 4 as the other direction (Y direction in the figure).

Figure 2:
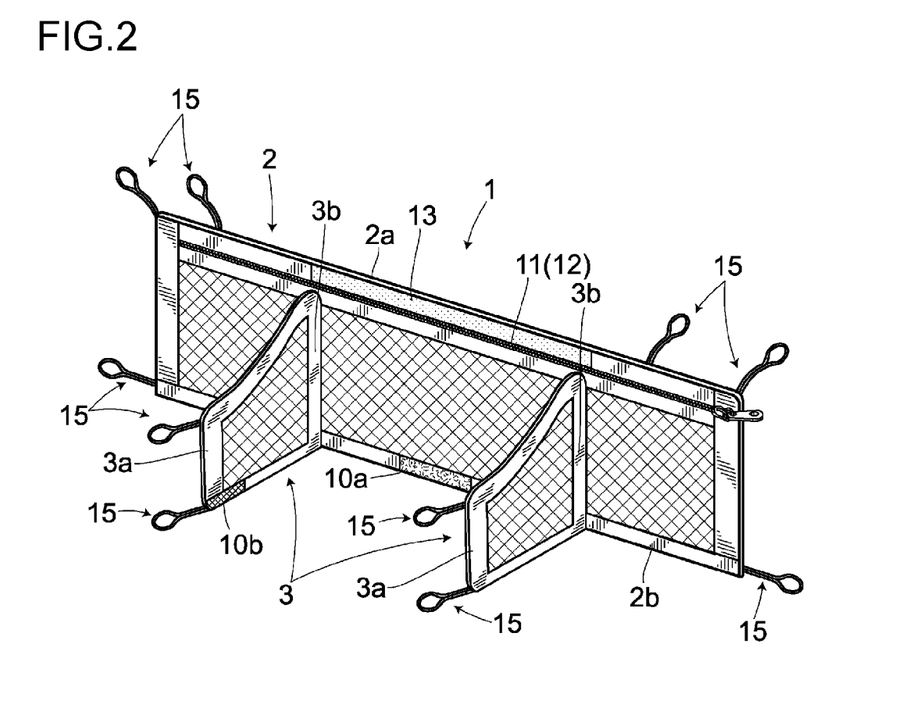
FIG. 2 is a perspective view showing the general structure of the partition.

As shown in FIG. 2, the partition 1 has a plurality of (in the embodiment, two) sub partition members 3, each of which is formed in a substantially trapezoidal shape and the two sub partition members 3 are protrudingly attached to the main partition member 2 formed in a horizontally long rectangular shape in a manner sandwiching the center in the lateral direction of the main partition member 2. The partition 1 has hook-and-loop fasteners 10b, which serve as sticking means detachably fixed to the substantial center of the main partition member 2, at respective short sides 3a of the sub partition members 3.

The main partition member 2 has an openable/closable opening provided with a slide fastener 11 at an upper side 2a, and a first pocket 12 is formed so as to be in communication with the opening. The upper side 2a of the main partition member 2 is provided with a reflective member 13 oriented rearwardly, and a hook-and-loop fastener 10a is provided at the substantial center of a lower side 2b.

The sub partition member 3 has a long side 3b abutting the front surface of the main partition member 2 and joined thereto. The sub partition member 3 has the hook-and-loop fastener 10b, which is attached to the hook-and-loop fastener 10a provided on the lower end 2b of the main partition member 2, at the lower end of the short side 3a, which serves as the leading end of the sub partition member 3. Accordingly, the short side 3a of the sub partition member 3 can tilt around the long side 3b, and the lower end of the short side 3a can be detachably fixed to the lower side 2b of the main partition member 2.

The partition 1 has connection parts 15 at the four corners of the main partition member 2 (four portions), the inside of the upper side (two portions), and the upper and lower ends of the short side 3a of the individual sub partition members 3 (four portions), a total of ten portions. The connection part 15 comprises an extensible cord 16 formed of a neoprene rubber string whose external periphery is covered with a polypropylene string. The connection part 15 has the extensible cord 16 having a predetermined length and folded at the substantial center, and the overlapped part is stitched so as to be formed in a loop-like shape.

Figure 3:
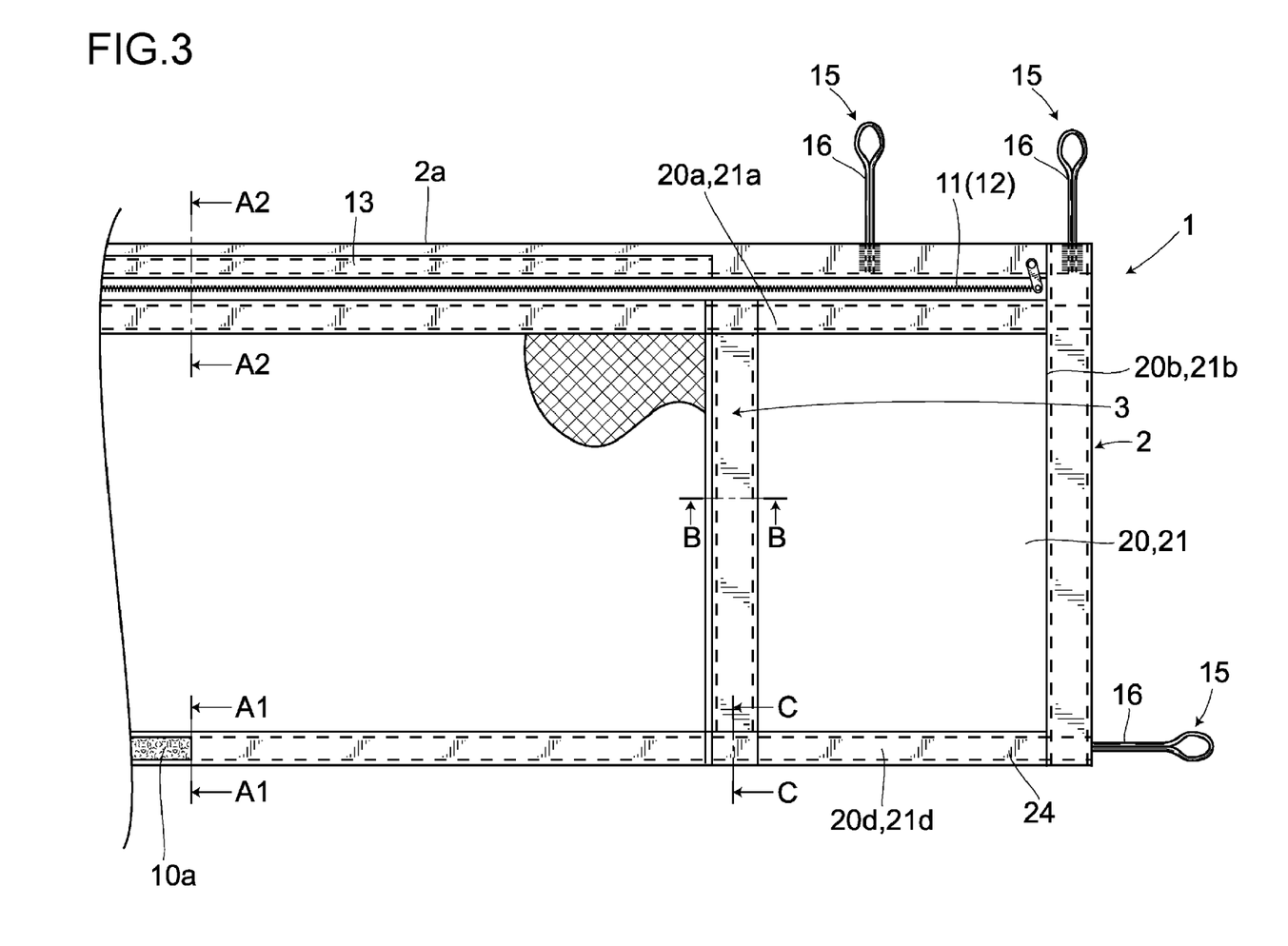
FIG. 3 is a front view showing the structure of the partition.
Figure 4:
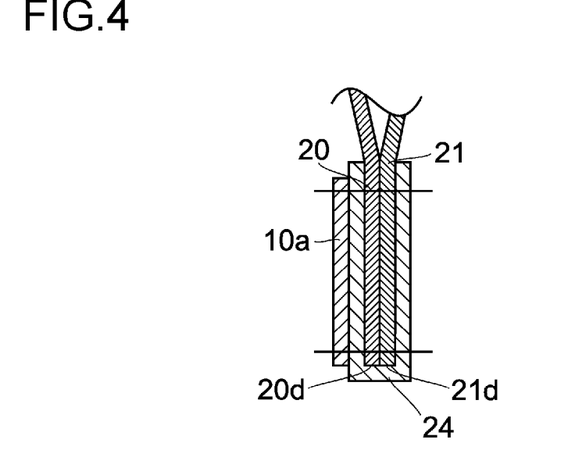
FIG. 4 is a partial cross-sectional view of the partition along a line A1-A1 in FIG. 3.

As shown in FIG. 3, the main partition member 2 has a first sheet 20 and a second sheet 21, each comprising a polyester mesh net formed in a horizontally-long rectangular shape. The main partition member 2 has three sides 20b, 20c (not shown), 20d, 21b, 21c (not shown), 21d of the first sheet 20 and the second sheet 21 other than the upper sides 20a and 21a covered with a nylon tape 24 formed in a U-shape, and stitched (FIG. 4), so that the main partition member 2 is formed as a bag. Note that the hook-and-loop fastener 10a is stitched to the tape 24 covering the lower sides 20d and 21d.

Figure 5:
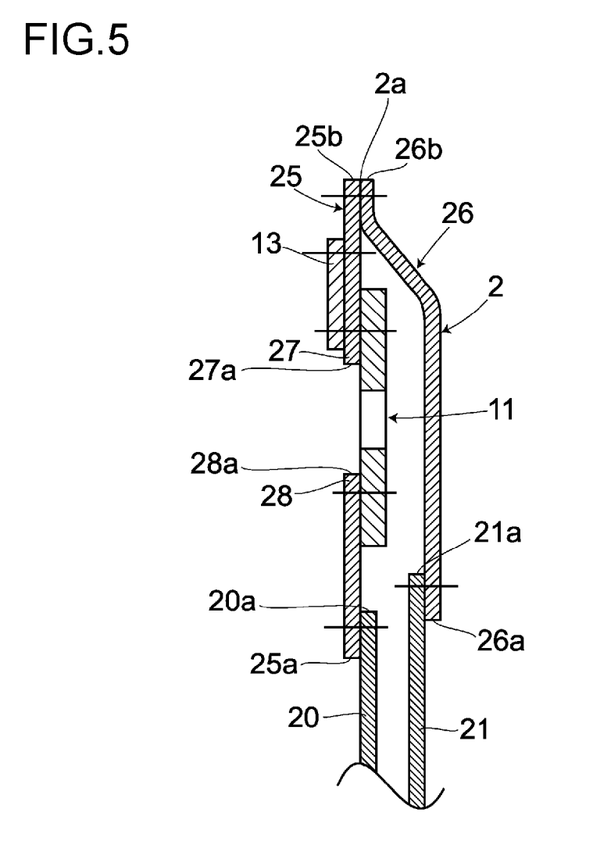
FIG. 5 is a partial cross-sectional view of the partition along a line A2-A2 in FIG. 3.

As shown in FIG. 5, the upper side 2a of the main partition member 2 is closed by a nylon front-face tape 25 and a nylon rear-face tape 26. The front-face tape 25 and the rear-face tape 26 have one ends 25a, 26a stitched to the upper sides 20a, 21a of the first and second sheets 20, 21, respectively, and the other ends 25b, 26b superimposed with each other and stitched together. The front-face tape 25 comprises an upper tape 27 and a lower tape 28. The upper and lower tapes 27, 28 are disposed in the vertical direction of the upper side 20a of the first sheet 20, and are connected together through the slide fastener 11 provided between facing sides 27a, 28a of the upper and lower tapes 27, 28. The reflective member 13 is stitched to the substantial center of the upper tape 27.

The end portions of the connection parts 15 are stitched and fixed to the respective four corners of the main partition member 2 between the portions of the U-shaped tape 24. Moreover, the end portions of the other connection parts 15 are stitched and fixed to the two portions of the inside of the upper side of the main partition member 2 between the front-face tape 25 and the rear-face tape 26 (see FIG. 3).

Figure 6:
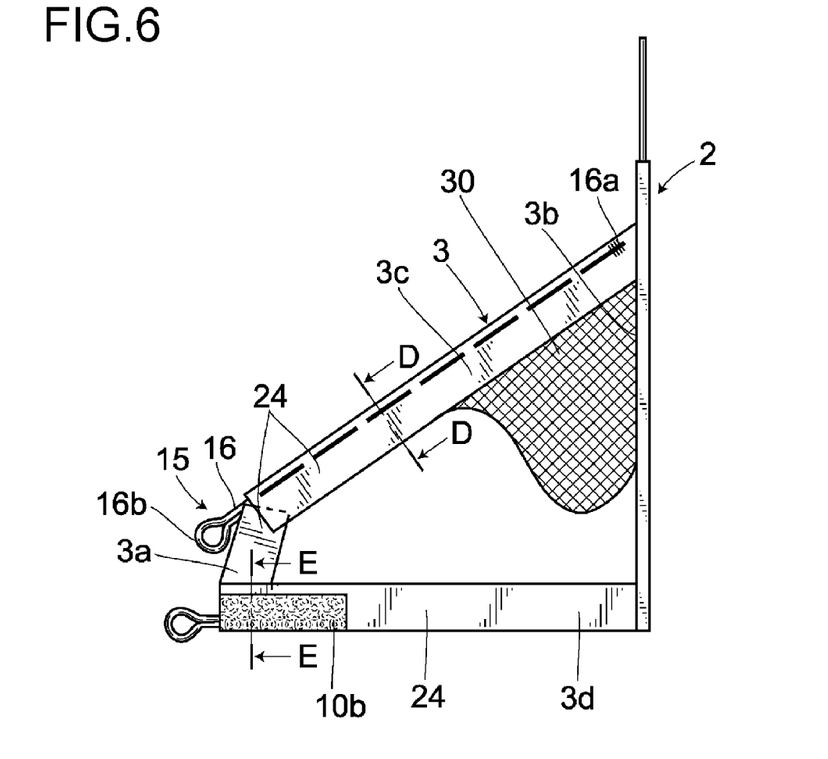
FIG. 6 is a side view showing the structure of the partition.
Figure 7:
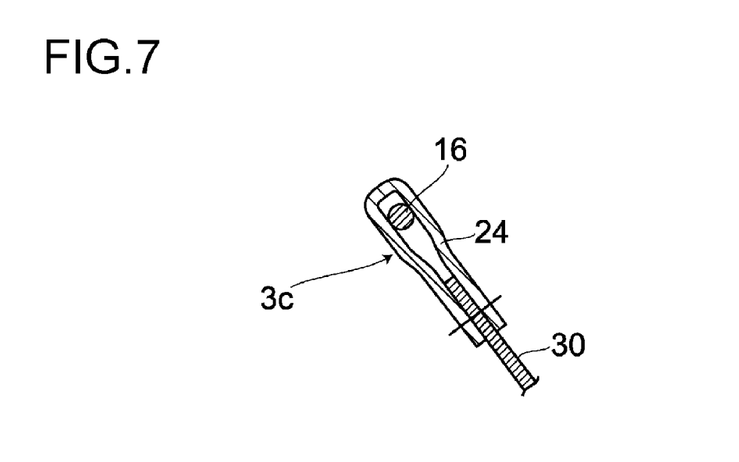
FIG. 7 is a partial cross-sectional view of the partition along a line D-D in FIG. 6.
Figure 8:
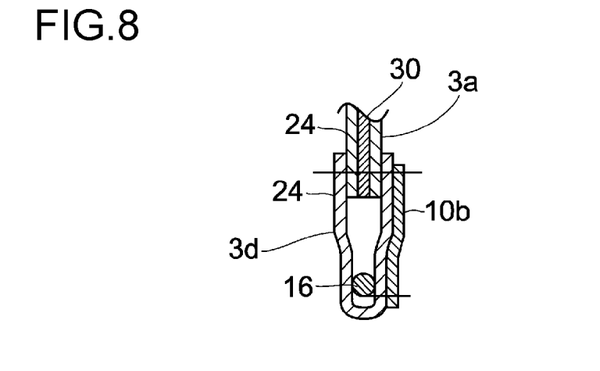
FIG. 8 is a partial cross-sectional view of the partition along a line E-E in FIG. 6.

As shown in FIG. 6, the sub partition member 3 has a third sheet 30 comprising a polyester mesh net formed in a substantially trapezoidal shape. The sub partition member 3 has the two sides, which are the long side 3b joined to the main partition member 2, and the short side 3a facing the long side 3b, stitched interleaving the nylon U-shaped tape 24 so that the sub partition member 3 is formed in a bag-like shape. The sub partition member 3 has two of an upper side 3c and a lower side 3d stitched so that the extensible cords 16 each comprising neoprene rubber string whose external periphery is covered with a polypropylene string are sandwiched between portions of the U-shaped tapes 24 (see FIGS. 7 and 8). The extensible cord 16 has one end 16a stitched together with the U-shaped tape 24 and fixed in the vicinity of the long side 3b. The other end 16b of the extensible cord 16 constitutes the connection part 15 in the vicinity of the short side 3a. That is, the other end 16b of the extensible cord 16 is folded back outside the U-shaped tape 24, and the overlapped portions thereof are stitched together to form a loop (see FIG. 6).

Figure 9:
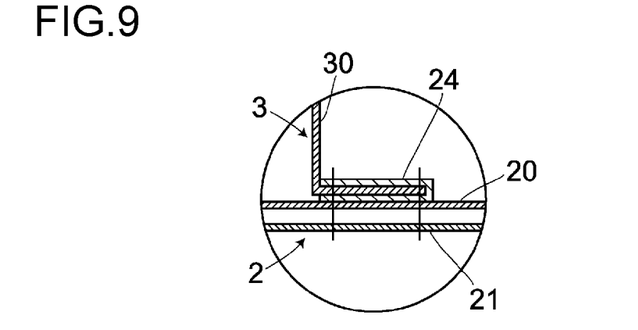
FIG. 9 is a partial cross-sectional view of the partition along a line B-B in FIG. 3.
Figure 10:
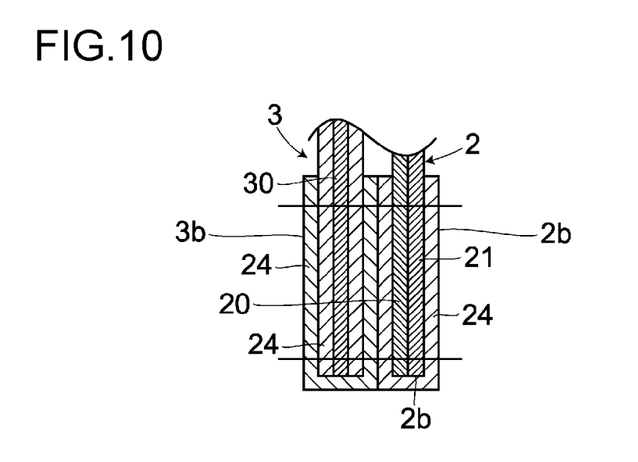
FIG. 10 is a partial cross-sectional view of the partition along a line C-C in FIG. 3.

The sub partition member 3 constituted in this fashion has the long side 3b abutting the surface of the main partition member 2 from the first sheet 20 side of the main partition member 2 and stitched together with the first sheet 20 so that the sub partition member 3 is fixed to the main partition member 2 (see FIG. 9). Note that the upper portion of the long side 3b of the sub partition member 3 is superimposed on the lower tape 28 of the main partition member 2 and stitched together therewith, while the lower portion of the long side 3b of the sub partition member 3 is superimposed on the U-shaped tape 24 of the lower side 2b of the main partition member 2, and stitched together therewith (see FIG. 10).

(2) Working and Effect

Figure 11A:
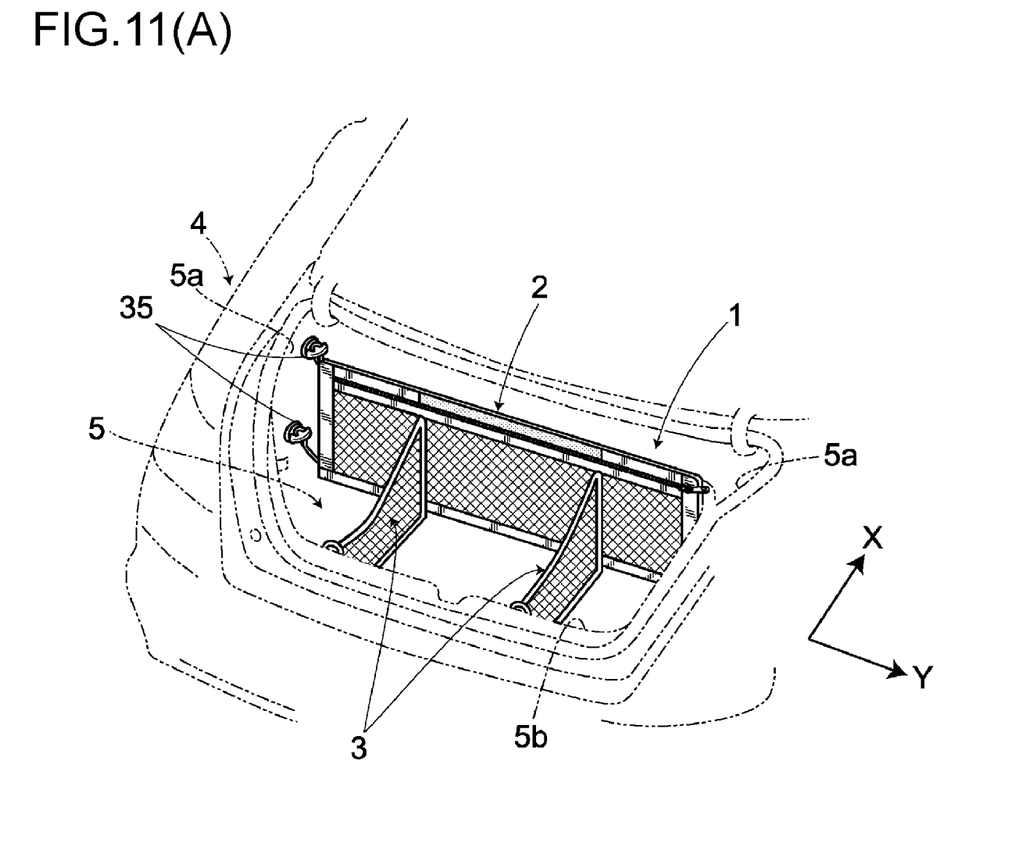
FIG. 11 is a perspective view showing how the partition is used.
Figure 11B:
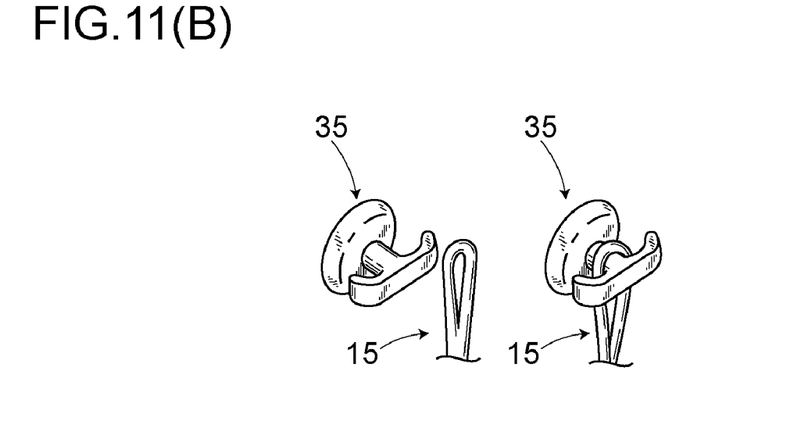

Next, an explanation will be given of the workings and effects of the individual parts of the partition 1 structured as explained above. As shown in FIG. 11, the partition 1 is disposed inside the luggage room 5 of the vehicle 4 with the connection parts 15 being caught by a plurality of respective anchors 35 provided beforehand. The anchor 35 is a T-shaped member provided on the side wall of the luggage room 5 in a protruding manner. The plurality of anchors 35 are appropriately provided at the right and left side walls and at the side walls of the rear end portion of the luggage room 5. As the connection parts 15 provided at the respective four corners of the main partition member 2 are caught by the respective anchors 35 provided on the right and left side walls of the luggage room 5, the main partition member 2 is hooked on the right and left side walls 5a of the luggage room 5, and disposed at the substantial center of the luggage room 5. Accordingly, the partition 1 can divide the luggage room 5 into the front part and the rear part.

Further, as the connection parts 15 provided at the respective short sides 3a of the sub partition members 3 are caught by the anchors 35 provided on a side wall 5b of the rear end of the luggage room 5, the partition 1 can allow the sub partition members 3 to be hooked between the main partition member 2 and the side wall 5b of the rear end of the luggage room 5. Accordingly, the partition 1 can divide the rear part of the luggage room 5 into a left part, a center part, and a right part.

As explained above, because the partition 1 of the embodiment has the sub partition members 3 in addition to the main partition member 2, it is possible not only to divide the luggage room 5 in the front-back direction (X direction), but also to divide the rear part of the luggage room 5 in the right-left direction (Y direction), i.e., into three rooms: a left part; a center part; and a right part. Therefore, the partition 1 improves the degree of freedom for a user to partition the luggage room 5, thereby fully preventing a luggage from moving.

The connection part 15 provided at the sub partition member 3 is structured in such a way that the one end is stitched together with the U-shaped tape 24 and fixed thereto in the vicinity of the long side 3b, while the other end is formed in a loop shape. Accordingly, because the connection part 15 has a long extensible cord 16, a length of extension when external force is applied becomes long by what corresponds to the length of the extensible cord 16. Therefore, according to the partition 1, it is possible to fit the sub partition member 3 in various luggage rooms of vehicles having different front-back direction lengths without changing the length of the sub partition member 3 because the extensible cord 16 can extend. This results in an improvement of the general versatility.

Because the partition 1 has the reflective member 13 provided at the upper tape 27 of the main partition member 2, a user can figure out the position of the main partition member 2 which separates the luggage room 5 back and forth. Therefore, the partition 1 can improve the visibility of the partition position with the door of the luggage room 5 being opened, thereby improving the workability of a user.

Figure 12:
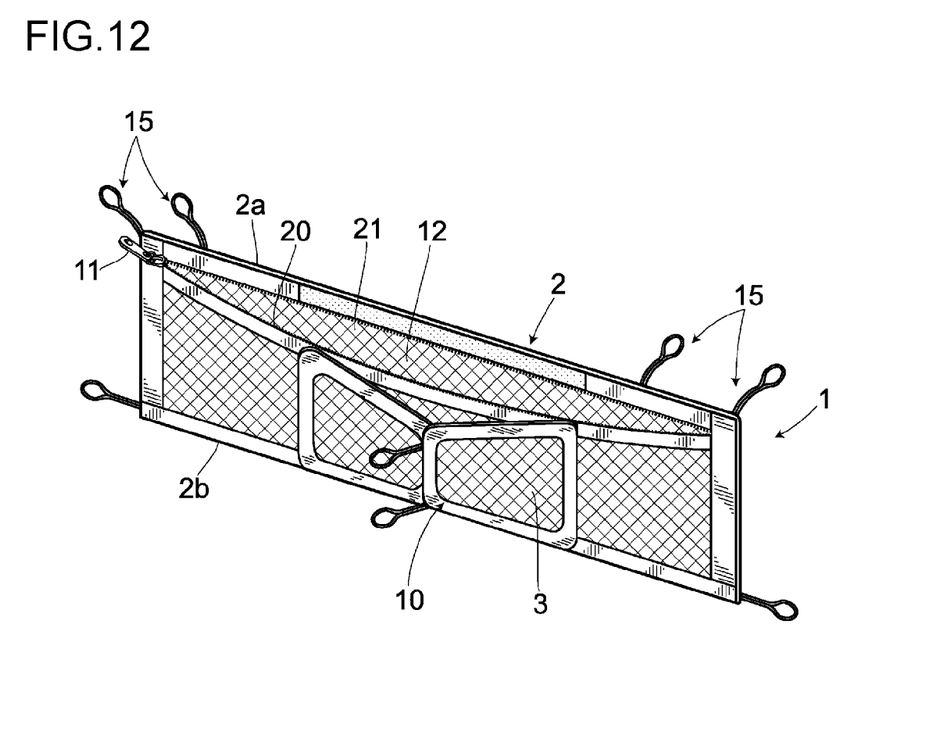
FIG. 12 is a perspective view showing how the partition is used with a first pocket being opened.

As shown in FIG. 12, the partition 1 has the main partition member 2 whose upper side is provided with the slide fastener 11 so as to form the openable/closable opening, and the first pocket 12 is so formed as to be in communication with the opening. Accordingly, the partition 1 divides the luggage room 5 in the front-back direction by the main partition member 2, and can store and hold a luggage inside the first pocket 12. Therefore, the partition 1 can hold not only a relatively large luggage by the main partition member 2 but also a relatively small luggage by the first pocket 12.

Figure 13:
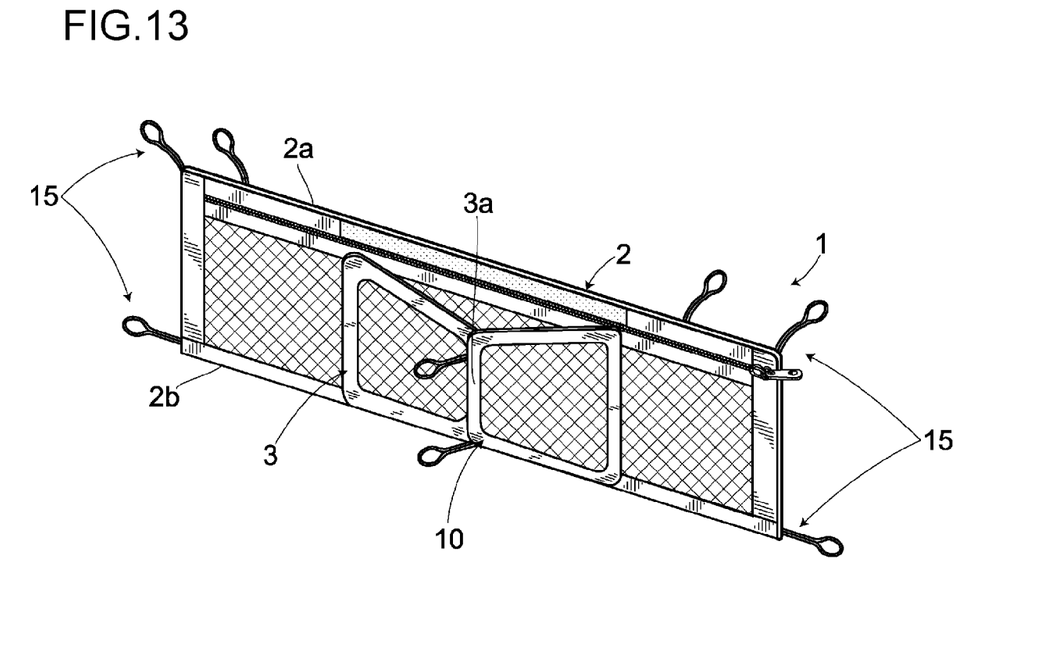
FIG. 13 is a perspective view showing how the partition is used with a sub partition member being fixed to a main partition member.

As shown in FIG. 13, the partition 1 can detachably fix the lower end of the short side 3a of the sub partition member 3 to the substantial center of the main partition member 2. Accordingly, the rear part of the luggage room 5 across the main partition member 2 can be used as a large space without partitioning it.

Figure 14:
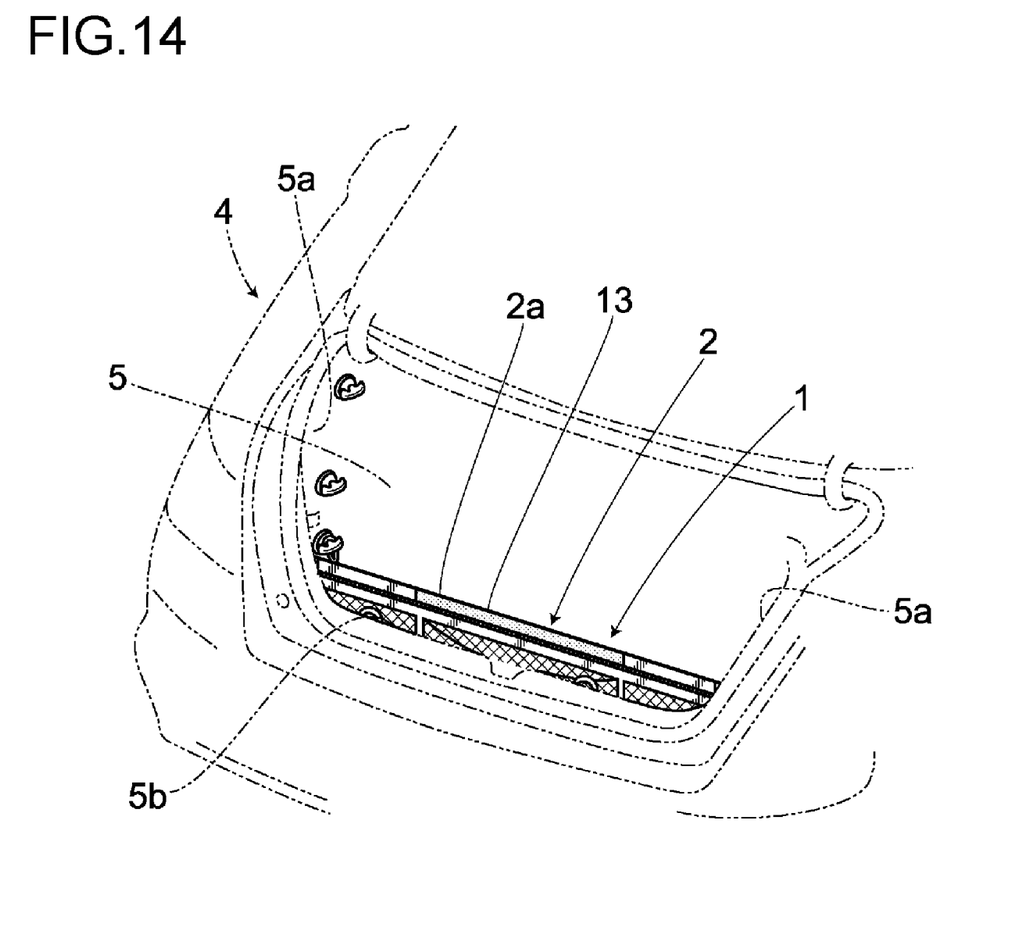
FIG. 14 is a perspective view showing how the partition is used.

As shown in FIG. 14, when the connection parts 15 provided inside the upper side 2a of the main partition member 2 are caught by the anchors 35 provided at the side wall 5b of the rear end of the luggage room 5, the main partition member 2 of the partition 1 can be positioned at a position that the main partition member 2 contacts the side wall 5b of the rear end of the luggage room 5. Accordingly, the partition 1 can close a portion of the side wall 5b of the rear end of the luggage room 5 opened in the front-back direction with the main partition member 2, and it is possible to prevent a luggage inside the luggage room 5 from falling out of the opening when the door of the luggage room 5 is opened. Further, because the partition has the reflective member 13 provided at the upper tape 27 of the main partition member 2, it is possible for a user to figure out where the rear end of the vehicle 4 is located.

2. Second Embodiment

Next, an explanation will be given of a partition according to the second embodiment of the invention. A partition 41 of the second embodiment differs from the first embodiment only in that a second pocket is formed. Accordingly, in the following explanation, the same structural parts will be denoted by the same reference numerals as those in the first embodiment, and the explanation thereof will be omitted for simplification.

Figure 15:
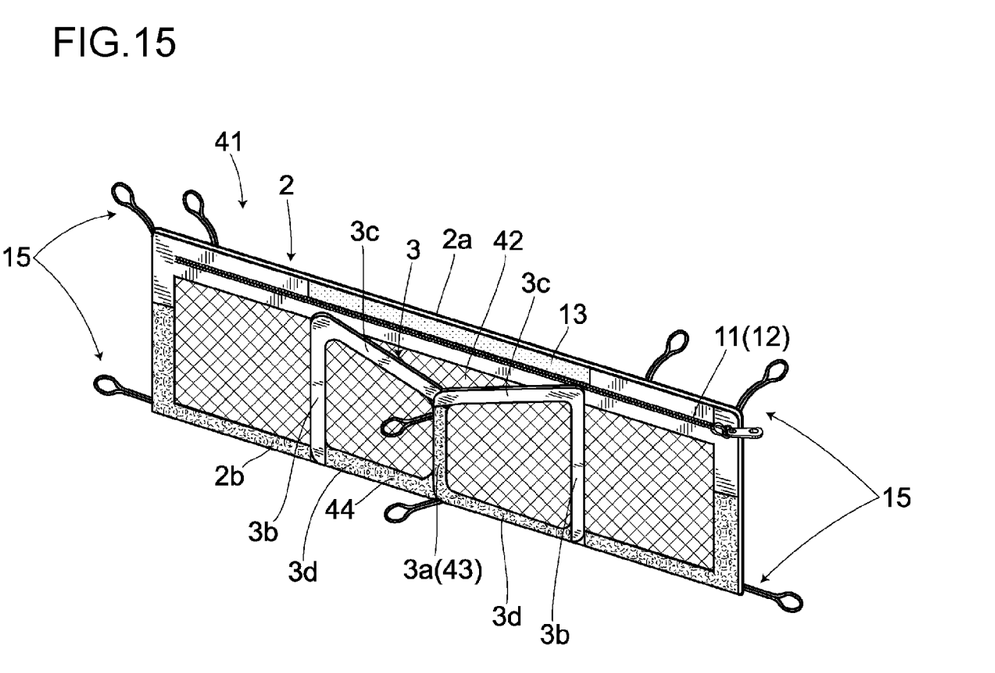
FIG. 15 is a perspective view showing a partition according to the second embodiment of the invention.

The partition 41 shown in FIG. 15 has the main partition member 2 and sub partition members 3, is formed in such a manner as to divide the luggage room 5 of the vehicle 4 in the front-back direction and the right-left direction, and is detachably disposed inside the luggage room 5 of the vehicle 4. In addition to the first pocket 12 formed in the main partition member 2, the partition 41 has a second pocket as a storage between the main partition member 2 and the sub partition members 3.

The pair of sub partition members 3 are folded inwardly to attach the respective short sides 3a together by hook-and-loop fasteners 43, and the respective lower sides 3d are attached to the lower side 2b of the main partition member 2 by hook-and-loop fasteners 44. Accordingly, the partition 41 can form a second pocket 42, having an opening at the upper ends of the sub partition members 3, at the center of the main partition member 2. Therefore, the partition 41 can hold a relatively large luggage with the main partition member 2, and can store and hold a relatively small luggage with the first pocket 12 and the second pocket 42.

Figure 16:
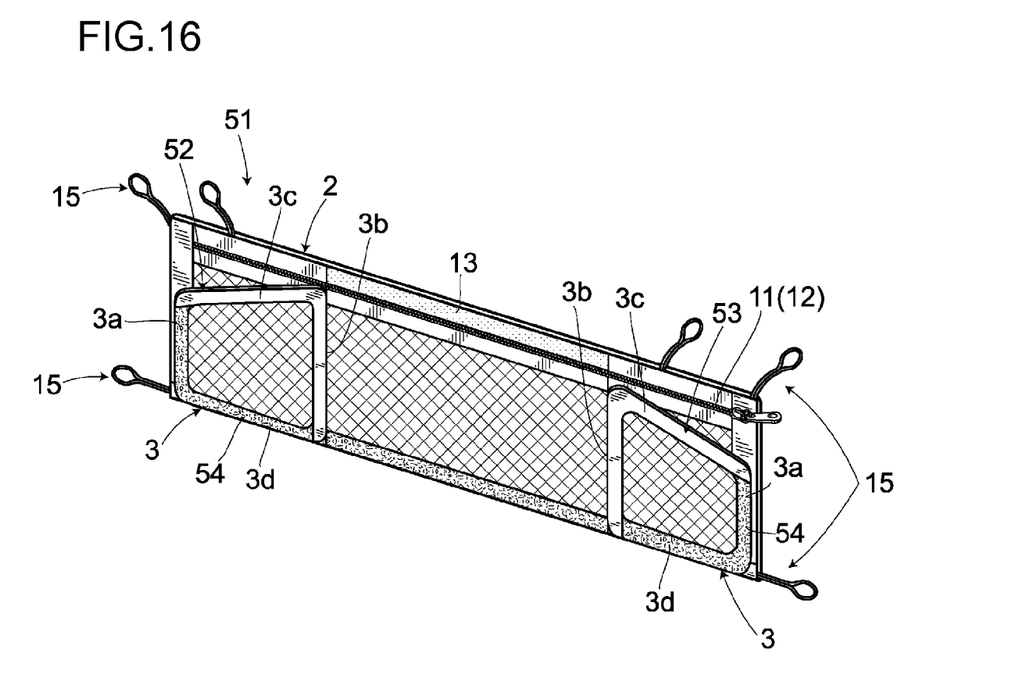
FIG. 16 is a perspective view showing a modified example.

Moreover, as shown in FIG. 16, a partition 51 has the pair of sub partition members 3 respectively folded outwardly, and the two short side 3a and lower side 3d other than the upper side 3c are attached to the side of the main partition member 2 and the lower side thereof, respectively by hook-and-loop fasteners 54. Accordingly, the partition 51 can form a third pocket 52 and a fourth pocket 53 each having an opening at the upper end of the sub partition member 3 at the right of the main partition member 2 and the left thereof, respectively.

The present invention is not limited to the foregoing embodiments, and can be changed and modified in various forms within the scope of the invention. For example, in the specification, the explanation has been given of the case where the main partition member and the sub partition members have sheets each comprised of a mesh net, but the present invention is not limited to this case, and a cloth or a vinyl sheet may be employed.

In the specification, the explanation has been given of the case where a hook-and-loop fastener is used as sticking means, but the invention is not limited to this case, and for example, a snap fastener may be used.

Although the sub partition member is formed in a trapezoidal shape in the specification, the present invention is not limited to this case, and the sub partition member may be formed in a rectangular or square shape.

The explanation has been given of the case where the two sub partition members are provided across the center of the main partition member in the lengthwise direction in the specification, but the present invention is not limited to this case, and one or three sub partition members may be provided for the main partition member.

What is claimed is:
1. A partition, which divides a luggage room of a vehicle, comprising:
    a main partition member which divides the luggage room in one direction;
    at least one sub partition member which divides the luggage room in another direction; and
    a sticking means for detachably holding an outer periphery of the sub partition member to a surface of the main partition member, wherein the main partition member includes at least one first connection part detachably connectable to a first anchor provided in the luggage room, wherein a first side end of the sub partition member has a second connection part detachably connectable to a second anchor provided in the luggage room, wherein a second side end of the sub partition member is coupled to the main partition member, and wherein said first side end is tiltable around said second side end.

2. The partition according to claim 1, wherein the main partition member has one of said at least one first connection part at each side end of the main partition member, and wherein the first vertical direction is orthogonal to the second vertical direction.

3. The partition according to claim 1, wherein the main partition member has a reflective member at an upper side of the main partition member.

4. The partition according to claim 2, wherein the main partition member has a reflective member at an upper side of the main partition member.

5. The partition according to claim 1, wherein said main partition member is made of a flexible material.

6. The partition according to claim 2, wherein said main partition member is made of a flexible material.

7. The partition according to claim 1, wherein said main partition member includes a pocket.

8. The partition according to claim 2, wherein said main partition member includes a pocket.

9. A partition, which divides a luggage room of a vehicle, comprising:

a main partition member which divides the luggage room in one direction;

at least one sub partition member which divides the luggage room in another direction; and a sticking means for detachably holding an outer periphery of the sub partition member to a surface of the main partition member, wherein the main partition member includes at least one first connection part detachably connectable to a first anchor provided in the luggage room, wherein a first side end of the sub partition member has a second connection part detachably connectable to a second anchor provided in the luggage room, and wherein a second side end of the sub partition member is coupled to the main partition member along a length of the sub partition member.

10. The partition according to claim 9, wherein the main partition member has one of said at least one first connection part at each side end of the main partition member, and wherein the sub partition member divides the luggage room in a direction orthogonal to the main partition member.

11. The partition according to claim 9, wherein the main partition member has a reflective member at an upper side of the main partition member.

12. The partition according to claim 10, wherein the main partition member has a reflective member at an upper side of the main partition member.

13. The partition according to claim 9, wherein said main partition member is made of a flexible material.

14. The partition according to claim 10, wherein said main partition member is made of a flexible material.

15. The partition according to claim 9, wherein said main partition member includes a pocket.

16. The partition according to claim 10, wherein said main partition member includes a pocket.

* * * * *